United States Patent
Qin et al.

(10) Patent No.: US 11,280,924 B2
(45) Date of Patent: Mar. 22, 2022

(54) SUPPRESSING NOISES IN SEISMIC DATA

(71) Applicant: Saudi Arabian Oil Company, Dhahran (SA)

(72) Inventors: Fuhao Qin, Dhahran (SA); Constantinos Tsingas, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 671 days.

(21) Appl. No.: 15/597,861

(22) Filed: May 17, 2017

(65) Prior Publication Data
US 2018/0335535 A1 Nov. 22, 2018

(51) Int. Cl.
*G01V 1/36* (2006.01)
(52) U.S. Cl.
CPC .............. *G01V 1/364* (2013.01); *G01V 1/362* (2013.01); *G01V 2210/24* (2013.01); *G01V 2210/242* (2013.01); *G01V 2210/3246* (2013.01); *G01V 2210/512* (2013.01); *G01V 2210/514* (2013.01)

(58) Field of Classification Search
None
See application file for complete search history.

(56) References Cited

U.S. PATENT DOCUMENTS

| | | | |
|---|---|---|---|
| 4,992,995 A * | 2/1991 | Favret | G01V 1/36 367/43 |
| 5,537,319 A * | 7/1996 | Schoen | G01V 1/28 702/14 |
| 8,681,581 B2 | 3/2014 | Moldoveanu et al. | |
| 9,188,693 B2 | 11/2015 | Monk et al. | |
| 9,329,293 B2 | 5/2016 | Parkes et al. | |
| 2007/0078604 A1 * | 4/2007 | Kim | G01V 1/32 702/16 |

(Continued)

FOREIGN PATENT DOCUMENTS

| | | |
|---|---|---|
| CN | 103675903 A | 3/2014 |
| EP | 2108131 A2 | 10/2009 |

(Continued)

OTHER PUBLICATIONS

Martinson et al., "Seismic Processing: Trace Interpolation and Wavelet Estimation", 1990 SEG Annual Meeting, Sep. 23-27, 1990 (Year: 1990).*
Qin et al., "Extraction of Geological Information from Seismic Data Contaminated by Coherent Noise," SPE-183830-MS, SPE Middle East Oil and Gas Show and Conference, Mar. 6-9, 2017, 5 pages.
Chiu, "Coherent and random noise attenuation via multichannel singular spectrum analysis in the randomized domain: coherent and random noise attenuation in the randomized domain," Geophysical Prospecting vol. 61, No. S1, Jul. 19, 2012, 9 pages.

(Continued)

*Primary Examiner* — Brent A. Fairbanks
(74) *Attorney, Agent, or Firm* — Fish & Richardson P.C.

(57) ABSTRACT

The present disclosure describes methods and systems, including computer-implemented methods, computer program products, and computer systems, for suppressing noises in seismic data. One computer-implemented method includes receiving, at a data processing apparatus, a set of seismic data associated with a subsurface region; flattening, by the data processing apparatus, the set of seismic data according to an identified seismic event; dividing, by the data processing apparatus, the set of seismic data into a plurality of spatial windows; randomizing, by the data processing apparatus, the set of seismic data according to a random sequential order; filtering, by the data processing apparatus, the randomized seismic data; and reorganizing, by the data processing apparatus, the filtered seismic data according to a pre-randomization order.

14 Claims, 6 Drawing Sheets

(56) References Cited

U.S. PATENT DOCUMENTS

| | | | |
|---|---|---|---|
| 2012/0029827 A1* | 2/2012 | Pepper | G01V 1/282 |
| | | | 702/16 |
| 2013/0124161 A1* | 5/2013 | Poudret | G01V 99/005 |
| | | | 703/2 |
| 2014/0269169 A1 | 9/2014 | van Borselen et al. | |
| 2014/0269182 A1* | 9/2014 | Parkes | G01V 1/3861 |
| | | | 367/24 |
| 2014/0288842 A1* | 9/2014 | Maraschini | G01V 1/364 |
| | | | 702/17 |
| 2017/0031047 A1* | 2/2017 | Cheng | G01V 1/364 |

FOREIGN PATENT DOCUMENTS

| | | |
|---|---|---|
| EP | 2909655 A1 | 8/2015 |
| WO | WO2009018525 A2 | 2/2009 |
| WO | WO2012158456 A1 | 11/2012 |

OTHER PUBLICATIONS

International Search Report and Written Opinion issued in International Application No. PCT/US2018/032728 dated Aug. 17, 2018, 16 pages.

Berkhout et al., "Estimation of Multiple Scattering by Iterative Inversion," Part I: Theoretical considerations: Geophysics, 62, Sep.-Oct. 1997, pp. 1586-1595.

Chen et al., "Multiples Attenuation using Trace Randomization and Empirical Mode Decomposition," SEG Technical Program expanded abstracts, Published in 2016, pp. 4498-4502.

Weglein et al., "An Inverse-Scattering Series Method for Attenuating Multiples in Seismic Reflection Data," Geophysics, 62, Nov.-Dec. 1997, pp. 1975-1989.

Gulf Cooperation Council Examination Report issued in GCC Application No. 2018-35324 dated Nov. 20, 2019, 4 pages.

* cited by examiner

102
receiving, at a data processing apparatus, a set of seismic data associated with a subsurface region

104
flattening, by the data processing apparatus, the set of seismic data according to an identified seismic event

106
dividing, by the data processing apparatus, the set of seismic data into a plurality of spatial windows

108
randomizing, by the data processing apparatus, the set of seismic data according to a random sequential order

110
filtering, by the data processing apparatus, the randomized seismic data

112
reorganizing, by the data processing apparatus, the filtered seismic data according to a pre-randomization order

SUPPRESSING NOISES IN SEISMIC DATA

TECHNICAL FIELD

This disclosure relates to suppressing noises in seismic data.

BACKGROUND

In a geophysics analysis, seismic data are collected and used in analyzing the subsurface geological structure and rock properties of a geographic area. These data, and the analysis based on these data, are instrumental in the exploration, production, and drilling operation of the oil and gas industry.

SUMMARY

The present disclosure describes methods and systems, including computer-implemented methods, computer program products, and computer systems for suppressing noises in seismic data. One computer-implemented method for suppressing noises in seismic data includes receiving, at a data processing apparatus, a set of seismic data associated with a subsurface region; flattening, by the data processing apparatus, the set of seismic data according to an identified seismic event; dividing, by the data processing apparatus, the set of seismic data into a plurality of spatial windows; randomizing, by the data processing apparatus, the set of seismic data according to a random sequential order; filtering, by the data processing apparatus, the randomized seismic data; and reorganizing, by the data processing apparatus, the filtered seismic data according to a pre-randomization order.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that, in operation, cause the system to perform the actions. One or more computer programs can be configured to perform particular operations or actions by virtue of including instructions that, when executed by data processing apparatus, cause the apparatus to perform the actions.

The details of one or more implementations of the subject matter of this specification are set forth in the accompanying drawings and the description below. Other features, aspects, and advantages of the subj ect matter will become apparent from the description, the drawings, and the claims.

DESCRIPTION OF DRAWINGS

FIG. 1 illustrates an example seismic data noise suppressing process, according to an implementation.

DETAILED DESCRIPTION

Figure 2:
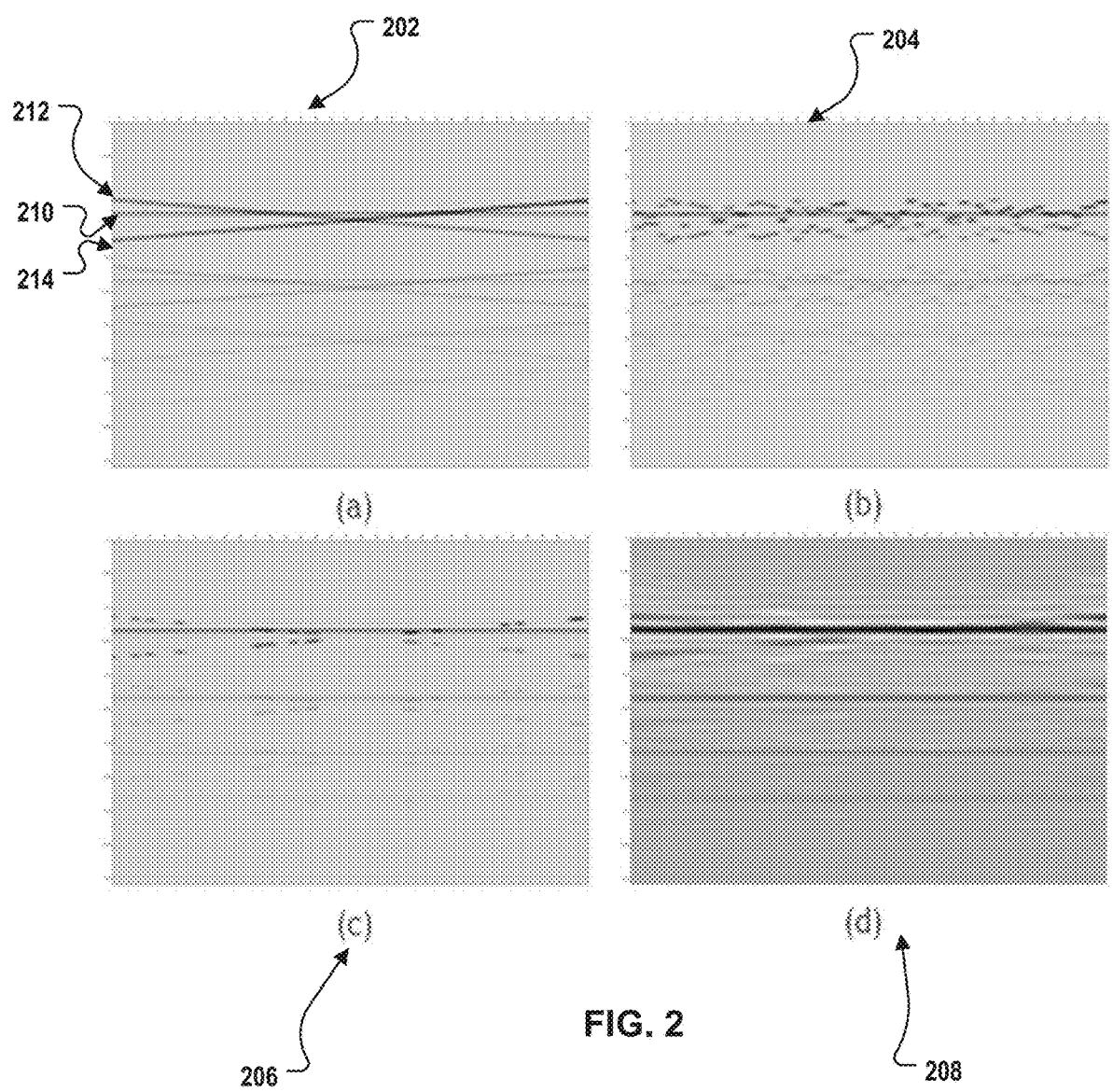
FIG. 2 illustrates example effects of the seismic data noise suppressing process, accordingly to an implementation.

The following description is presented to enable any person skilled in the art to make and use the disclosed subject matter, and is provided in the context of one or more particular implementations. Various modifications to the disclosed implementations will be readily apparent to those skilled in the art, and the general principles defined herein may be applied to other implementations and applications, without departing from scope of the disclosure. Thus, the present disclosure is not intended to be limited to the described and/or illustrated implementations, but is to be accorded the widest scope consistent with the principles and features disclosed herein.

This disclosure generally describes methods and systems, including computer-implemented methods, computer program products, and computer systems, for suppressing noises in seismic data. In some cases, seismic signals can be transmitted into the subsurface of the earth at a source location by a source device. Examples of the seismic signals include acoustic signals. The seismic signals travel through the subsurface and can be received by a receiver device placed at a receiver location. In some cases, the source device, the receiver device, or a combination thereof can be placed at the surface. The signals can propagate downwards until they reach a reflecting structure and reflect upwards, towards the surface. Because the signals have refracted and reflected through the substructure, the characteristics of the received signals contain information of the substructure. The received signals can be collected as seismic data. The seismic data can include traces of the reflection waves.

In a marine survey, air guns and hydrophones can be used as the source devices and the receiver devices, respectively. During the acquisition, seismic sources are exploded from arrays of air guns. The reflected and refracted signals are acquired by streamers of hydrophones. In a land acquisition, dynamite can be used an explosive source and a geophone is employed as a receiver device. In another example, vibratory trucks can be used as source devices. Other devices that generate and receive seismic signals can also be used.

In some implementations, migration operations are applied on the seismic data to image the subsurface structure. Seismic migration is the process by which seismic events are geometrically re-located in either space or time to the location the event occurred in the subsurface rather than the location where it was recorded at the surface, thereby creating a more accurate image of the subsurface. Migration of seismic data is the correction of the flat-geological-layer assumption by a numerical, grid-based spatial convolution of the seismic data to account for dipping events (where geological layers are not flat). In a migration process, the echo information contained in the seismic data is converted from recording time to features in subsurface depth. The migration process puts seismic features in their locations in space, both laterally and vertically.

Different migration algorithms can be used. For example, in the depth domain, the ray-based and beam-based Kirchhoff methods were popular in practice due to their computational efficiency and target-oriented flexibility. Following that, the one-way and two-way wave-equation migrations were used broadly. In some cases, reverse time migration (RTM) can be used in analysis migrations. The RTM algorithm includes calculations of forward propagation of the source wavefield, the backward propagation of the receiver wavefield, and the associated imaging condition between the two computed wavefields. In some cases, source wavefield and receiver wavefield can be referred to as forward wavefield and backward wavefield, respectively. In the time domain, imaging is usually achieved by either common-depth-point (CDP) stacking which assumes flat subsurface structure following by post-stack migration, or pre-stack time migration similar to the Kirchhoff migration in the depth domain. However, the travel time for energy travel from the source and the receiver to the image point is not calculated by ray tracing as in the depth domain. It is based on Normal Move Out (NMO) velocity and Dix formula that assumes velocity model formed with relatively flat and thick layers.

In some cases, reliable seismic images generated based on the seismic data may be difficult to obtain due to noises in the seismic data. For example, the seismic data may be affected by the internal multiples associated with a subsurface structure. These internal multiples may be caused by seismic energy that bounces around by multiple reflection interfaces in the subsurface of the geographic area. These internal multiples may be referred to as noises in the seismic data. Some of those multiple noises may have similar apparent dips as that of primary seismic events and thus may not be suppressed or discriminated by stacking or migration operators. In some cases, for example in a land seismic survey, seismic noises can also include effects from the imperfect static or near-surface model, irregular shot and receiver distribution, and near-surface diffractions and scattering.

In some implementations, the seismic multiple noises may be suppressed based on prediction of the multiple arrivals followed by their subtraction from the acquired data. These prediction and subtraction techniques may work well for surface-related multiples in deep water marine data, due to the good data quality and relatively larger apparent dip discrimination between the multiple and primary events. On the other hand, due to the near-surface-geological complexity in some geographic areas, the prediction and subtraction schemes may not work well on land seismic data. As a result, final seismic images from stacking or migration often include substantial amounts of coherent noise. The noise, in some cases, may be so strong that it can damage the real seismic reflections and thus can obscure seismic interpretation.

Processing difficulties arise when real seismic events have very small dip differences from the noise. In this situation, frequency-wave (F-K) filtering or other noise removal methods such as median filters may not be able to separate the noise from primary events.

The noise suppression process can be performed on pre-stack data or post-stack data. In a pre-stack data application, seismic events in shot or CDP gathers may be lined up and flattened. Data randomization and noise suppression processes can be performed to suppress the noise. However, the effect of the randomizing the pre-stack data depends on the accuracy of the Normal Move Out (NMO) velocity used in the process. If the NMO velocity is not accurate, the randomization may fail to align the coherent seismic events and fail to effectively suppress the noise.

In a post-stack data application, the operation is applied on the final image of the seismic data. For example, the data can be NMO stack, pre-stack time migration or pre-stack depth migration results. Interpreters identify the events on the data as primary reflection or noise such as multiple reflection. The identification can be based on general geology knowledge, known regional geology characterization or existing well information. The events can also be trial interpretation scenarios by the interpreters when they cannot make a definite identification of events due to the data quality or lack of other information.

Once the seismic events are identified and mapped, seismic data are squeezed and stretched vertically so that the identified events are flattened followed by sequential randomization of the flattened data. The coherency of seismic events parallel to the identified events is retained while the coherency of other events is reduced. The coherent events can then be extracted while the other events can be suppressed using filtering. These other events can also be obtained through subtraction between the original data and the filtered data after randomization and noise suppression for further analysis.

FIG. 1 illustrates an example seismic data noise suppressing process 100, according to an implementation. For clarity of presentation, the description that follows generally describes process 100 in the context of FIGS. 2-6. However, it will be understood that process 100 may be performed, for example, by any other suitable system, environment, software, and hardware, or a combination of systems, environments, software, and hardware, as appropriate. In some cases, the process 100 can be executed on a large scale computer clusters, super computers, or any other computing device or collection of computing devices. In some implementations, various steps of process 100 can be run in parallel, in combination, in loops, and/or in any order.

At 102, a set of seismic data associated with a subsurface region is received at a data processing apparatus. The set of seismic data can be a set of receiver signal data acquired for the subsurface region. In some cases, during seismic data acquisition, a source (dynamite, vibratory truck, airgun array, or the like) is activated and the reflections/refractions/transmissions from the subsurface geological boundaries are recorded by the receiver devices which are located on the surface of the Earth. This type of acquisition is repeated for each shot, sequentially or simultaneously, until all the seismic data have been acquired for this survey area. These acquired seismic data are included in the receiver signal data. In some cases, the acquired seismic data are collected in the field, transferred to an office (stored and transported via a computer network, a physical network, or a combination thereof), and used as inputs to a computing device executing the process 100.

In some cases, the set of seismic data can be post-stack data. For example, the seismic data can be final image of the seismic data. Examples of the post-stack data include NMO stack, pre-stack time migration results, and pre-stack depth migration results.

At 104, the set of seismic data is flattened according to one or more identified seismic events. Seismic flattening is an interpretation technique used to remove structures such as folds or faults to reveal the original subsurface structure when the geology strata was deposited. The flattening helps the interpreter recognize geological features based on one horizon. In an interpretation, one or more seismic events can be identified by an interpreter, an interpretation tool, or a combination thereof. The set of seismic data can be flattened based on the identified events. Examples of the identified events can include major faults where the events on both sides of the faults can be positively matched. To flatten the data based on the events, a trace location is chosen as anchor point. All other seismic traces will be adjusted according to the anchor trace. Seismic traces may be squeezed or stretched so that all identified events line up horizontally. The squeezing and stretching are realized by interpolating the data between adjacent identified events using the original un-flattened data.

At 106, the flattened data is divided into a plurality of overlapping spatial windows. If the size of each window is small, the coherent events in each window may be linear or close to linear and the amplitudes of the events do not vary significantly. The optimal window size varies from data to data. In some cases, testing can be performed to determine the window size.

At 108, the set of seismic data is rearranged according to a random sequential order. In one implementation, the data in each spatial window can be indexed based on a spatial distance corresponding to the spatial window. A randomization order can be generated. The data in each spatial window can be redistributed according to the randomization order. In one example, the randomization order is [4, 7, 3, 1, 2, 6, 5], and the set of seismic data is randomized based on the spatial distance in a horizontal direction. In this example, each spatial window is assigned an index from 1-7 based on the horizontal distance of the spatial window. During the sequential randomization, the data in the spatial window with a spatial distance indexed as 4 will be redistributed to the first position, followed by the data in the spatial window with a spatial distance indexed as 7, further followed by the data in the spatial window with a spatial distance indexed as 3, and so on.

At 110, the rearranged seismic data are filtered. In some cases, a median filter can be applied to extract the coherent horizontal events. The median filtering window size is usually much smaller than the data randomization window size. In some cases, testing can be performed to determine the median filtering window size. An FK filtering can also be used to extract the horizontal events by keeping only near zero K components. In some cases, testing can be performed to determine the FK filtering window size. Other techniques that extract linear events with known dips can also be employed.

At 112, the filtered data are reorganized based on its pre-randomization order. In the example given at step 108, after filtering, the data in the spatial window with a spatial distance indexed as 4 is returned from the first position to the fourth position.

In some cases, an image of the subsurface area can be generated based on the reorganized data. The image can be outputted by the data processing apparatus, transmitted to a different data processing apparatus, or a combination thereof.

FIG. 2 illustrates example effects of the seismic data noise suppressing process, accordingly to an implementation. FIG. 2 includes synthetic images 202, 204, 206, and 208. The image 202 illustrates an example set of synthetic seismic data that has been flattened on horizontal events identified based on an interpretation. As illustrated, the image 202 shows the flattened horizontal event 210, and two other events 212 and 214. The event 212 has a small dip to the right and the event 214 has a small dip to the left. Because the differences between the dips are small, direct filtering may not be effective in discriminating these events.

Image 204 illustrates the effect of the randomization of the seismic data. Here, the seismic data in the image 202 is a small window that is rearranged randomly on the horizontal direction. The horizontal events identified based on the interpretation are not affected by the randomization, but the coherence of the dipping events is destroyed. Image 206 illustrates the noise suppressing effect after the seismic data in the image 204 are filtered using a median filter and reorganized according to their original horizontal location. Here, the identified horizontal events are not affected but the dipping events are largely suppressed. Image 208 shows the F-K filtering result of image 204 after the filtered traces returned to their original locations. The noise residuals in image 208 are different from that in image 206.

In some cases, as shown in the image 206 and 208, there may be residual energy from the dipping events after the filtering and reorganization. However, the residual energy is discontinuous as shown in image 206 or weaker as appeared in image 208. Additional filtering processes can be used to further suppress the residual energy. As shown in images 206 and 208, the noise suppression process successfully suppresses the dipping coherent noise while keeping the horizontal events identified in the interpretation unaffected. In some cases, more than one interpretation can be performed, each of the interpretation can identify different events. The noise suppressing process discussed herein can be applied based on different interpretations in an iterative process. In each iteration, the seismic data is flattened according to the identified events according to a particular interpretation. These processes can generate cleaner seismic images according to the interpreter's choices, and help the interpreters to test different scenarios of interpretations.

Figure 3:
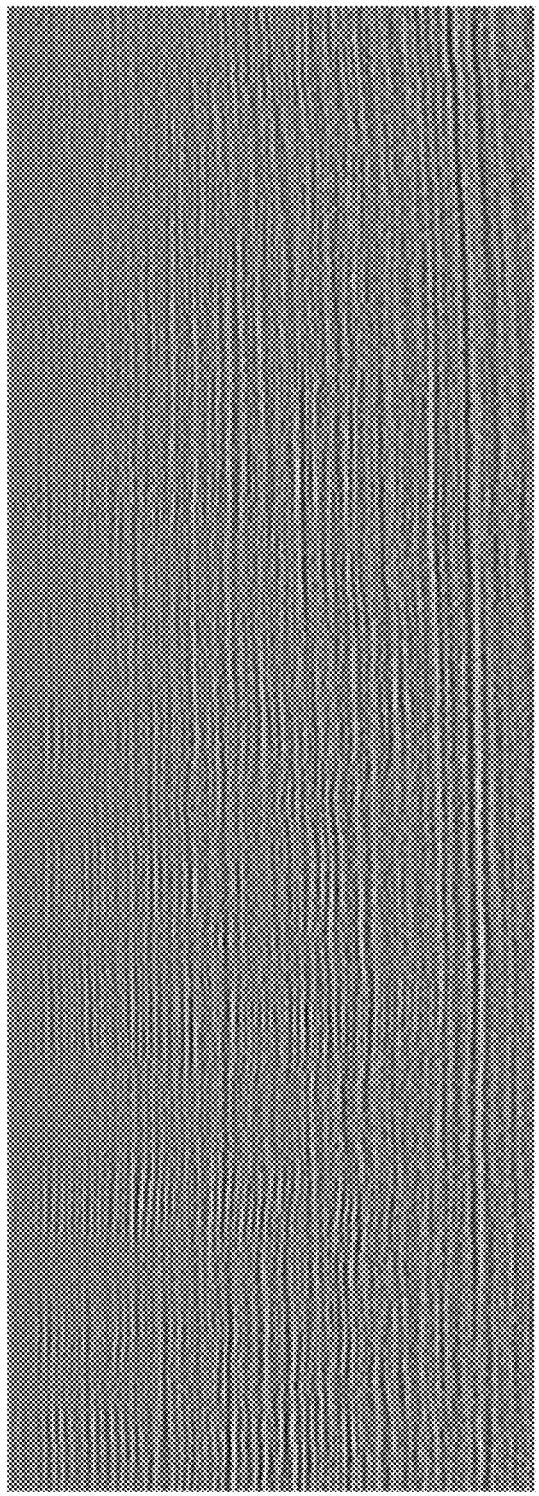
FIG. 3 illustrates an example pre-stack time migrated seismic section, according to an implementation.

FIG. 3 illustrates an example pre-stack time migrated seismic section, according to an implementation. As shown in FIG. 3, the coherent noise interferes with the primary reflections, which makes the interpretation difficult.

Figure 4:
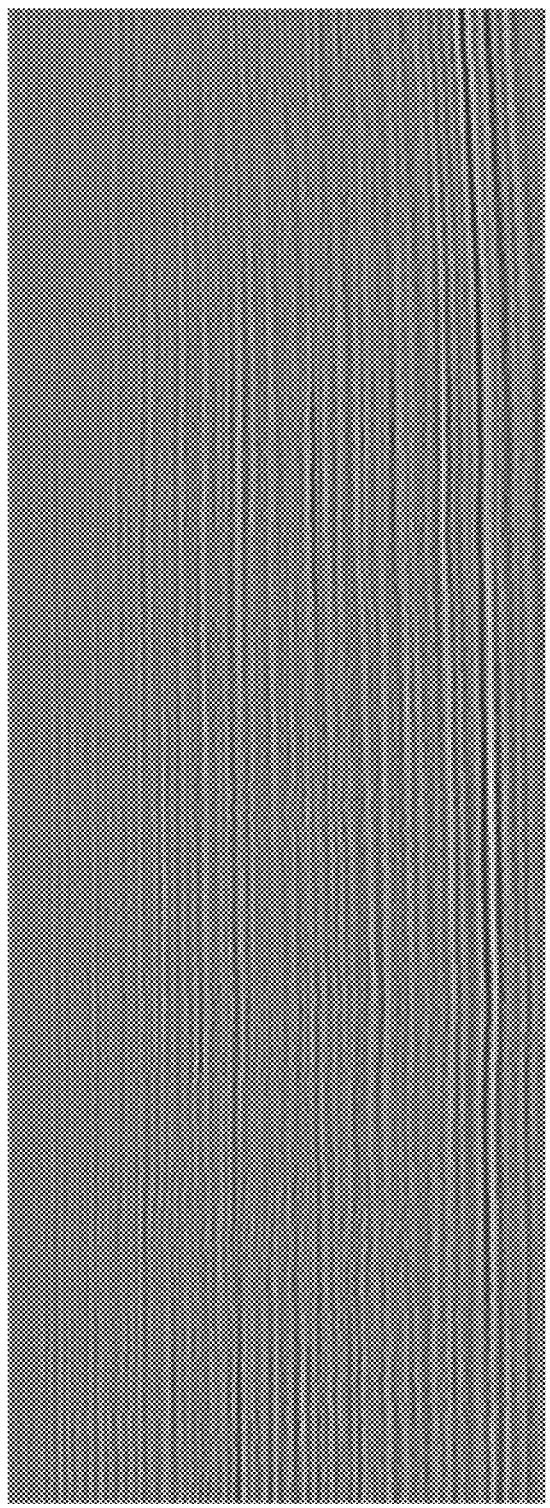
FIG. 4 illustrates an example result of filtered seismic data, according to an implementation.

In some cases, it can be assumed, based on geological and well information, that there may not be such dramatic structural variations and faulting in this area. Therefore, the rough appearance of the section in FIG. 3 may be generally due to the presence of coherent noise. In these cases, the seismic data can be flattened based on a primary seismic reflection event identified in an interpretation. Other reflection events that are parallel to the primary seismic reflection event may also be flattened. In the illustrated example, the seismic events are used to flatten the section since they are continuous and coherent. The randomization and filtering procedures are then applied to the flattened data and the flattening is removed. FIG. 4 illustrates an example result of filtered seismic data, according to an implementation. As shown in FIG. 4, most of the horizons are continuous and conform to the local geology. Interpreters can easily track the seismic events and derive the geological structure over the whole section using the new seismic image and well control in the area.

Figure 5:
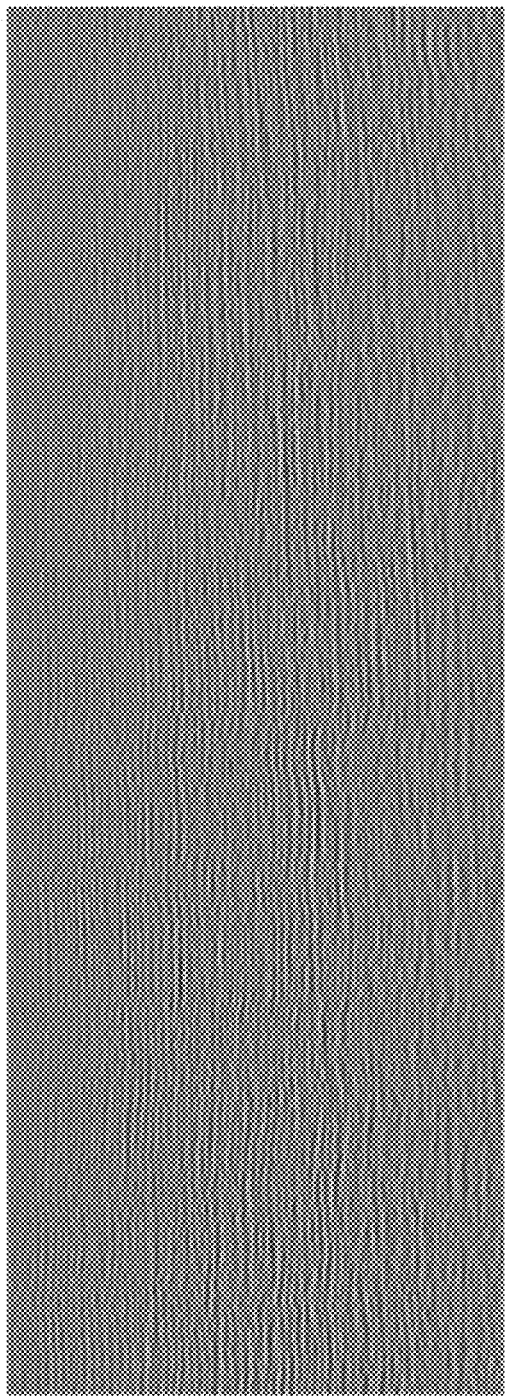
FIG. 5 illustrates an example comparison between the original seismic input and the extracted filtered seismic section, according to an implementation.

In some cases, the suppressed events can be obtained by subtracting the suppressed data (for example, the data shown in FIG. 4) from the unsuppressed data (for example, the data showing in FIG. 3). FIG. 5 illustrates an example comparison between the original seismic input and the extracted filtered seismic section, according to an implementation. As illustrated, the difference between the data includes mostly the piece-wise events corresponding to the noise on the original migration image. The difference can be analyzed, for example, by an interpreter, to confirm whether these events reflect noise in the seismic data.

Figure 6:
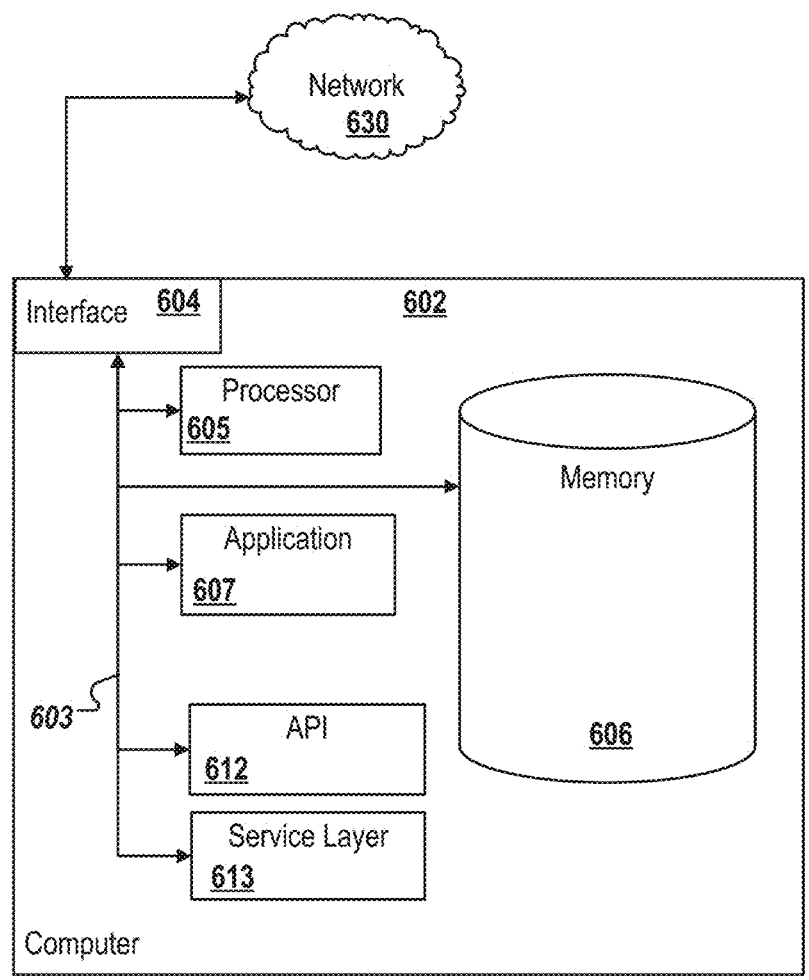
FIG. 6 is a high level architecture block diagram of a geophysical imaging system, according to an implementation Like reference numbers and designations in the various drawings indicate like elements.

FIG. 6 is a high level architecture block diagram of a geophysical imaging system, according to an implementation. At a high level, the illustrated system 600 includes a geophysical image processing computer 602 coupled with a network 630. The described illustration is only one possible implementation of the described subject matter and is not intended to limit the disclosure to the single described implementation. Those of ordinary skill in the art will appreciate the fact that the described components can be connected, combined, and/or used in alternative ways, consistent with this disclosure.

The network 630 facilitates communication between the computer 602 and other components, for example, components that obtain observed data for a location and transmit the observed data to the computer 602. The network 630 can be a wireless or a wireline network. The network 630 can also be a memory pipe, a hardware connection, or any internal or external communication paths between the components.

The computer 602 includes a computing system configured to perform the method as described herein. In some cases, the algorithm of the method can be implemented in an executable computing code, e.g., C/C++ executable codes. In some cases, the computer 602 can include a standalone Linux system that runs batch applications. In some cases, the computer 602 can include mobile or personal computers that have sufficient memory size to process each block of the geophysical data. The computer 602 can be used to implement the noise suppression process discussed in this disclosure.

The computer 602 may comprise a computer that includes an input device, such as a keypad, keyboard, touch screen, microphone, speech recognition device, other devices that can accept user information, and/or an output device that conveys information associated with the operation of the computer 602, including digital data, visual and/or audio information, or a GUI.

The computer 602 can serve as a client, network component, a server, a database, or other persistency, and/or any other component of the system 600. In some implementations, one or more components of the computer 602 may be configured to operate within a cloud-computing-based environment.

At a high level, the computer 602 is an electronic computing device operable to receive, transmit, process, store, or manage data and information associated with the system 600. According to some implementations, the computer 602 may also include, or be communicably coupled with, an application server, e-mail server, web server, caching server, streaming data server, business intelligence (BI) server, and/or other server.

The computer 602 can receive requests over network 630 from a client application (e.g., executing on another computer 602) and respond to the received requests by processing said requests in an appropriate software application. In addition, requests may also be sent to the computer 602 from internal users (e.g., from a command console or by another appropriate access method), external or third parties, other automated applications, as well as any other appropriate entities, individuals, systems, or computers.

Each of the components of the computer 602 can communicate using a system bus 603. In some implementations, any and/or all the components of the computer 602, both hardware and/or software, may interface with each other and/or the interface 604, over the system bus 603, using an application programming interface (API) 612 and/or a service layer 613. The API 612 may include specifications for routines, data structures, and object classes. The API 612 may be either computer language-independent or -dependent and refer to a complete interface, a single function, or even a set of APIs. The service layer 613 provides software services to the computer 602 and/or the system 600. The functionality of the computer 602 may be accessible for all service consumers using this service layer. Software services, such as those provided by the service layer 613, provide reusable, defined business functionalities, through a defined interface. For example, the interface may be software written in JAVA, C++, or other suitable language providing data in Extensible Markup Language (XML) format or other suitable format. While illustrated as an integrated component of the computer 602, alternative implementations may illustrate the API 612 and/or the service layer 613 as stand-alone components in relation to other components of the computer 602 and/or system 600. Moreover, any or all parts of the API 612 and/or the service layer 613 may be implemented as child or sub-modules of another software module, enterprise application, or hardware module, without departing from the scope of this disclosure.

The computer 602 includes an interface 604. Although illustrated as a single interface 604 in FIG. 6, two or more interfaces 604 may be used according to particular needs, desires, or particular implementations of the computer 602 and/or system 600. The interface 604 is used by the computer 602 for communicating with other systems in a distributed environment—including within the system 600—connected to the network 630 (whether illustrated or not). Generally, the interface 604 comprises logic encoded in software and/or hardware in a suitable combination and operable to communicate with the network 630. More specifically, the interface 604 may comprise software supporting one or more communication protocols associated with communications such that the network 630 or interface's hardware is operable to communicate physical signals within and outside of the illustrated system 600.

The computer 602 includes a processor 605. Although illustrated as a single processor 605 in FIG. 6, two or more processors may be used according to particular needs, desires, or particular implementations of the computer 602 and/or the system 600. Generally, the processor 605 executes instructions and manipulates data to perform the operations of the computer 602. Specifically, the processor 605 executes the functionality required for processing geophysical data.

The computer 602 also includes a memory 606 that holds data for the computer 602 and/or other components of the system 600. Although illustrated as a single memory 606 in FIG. 6, two or more memories may be used according to particular needs, desires, or particular implementations of the computer 602 and/or the system 600. While memory 606 is illustrated as an integral component of the computer 602, in alternative implementations, memory 606 can be external to the computer 602 and/or the system 600.

The application 607 is an algorithmic software engine providing functionality according to particular needs, desires, or particular implementations of the computer 602 and/or the system 600, particularly with respect to functionality required for processing geophysical data. For example, application 607 can serve as one or more components/applications described in FIGS. 1-5 and 7-10. Further, although illustrated as a single application 607, the application 607 may be implemented as multiple applications 607, on the computer 602. In addition, although illustrated as integral to the computer 602, in alternative implementations, the application 607 can be external to the computer 602 and/or the system 600.

There may be any number of computers 602 associated with, or external to, the system 600 and communicating over network 630. Further, the terms "client," "user," and other appropriate terminology may be used interchangeably, as appropriate, without departing from the scope of this disclosure. Moreover, this disclosure contemplates that many users may use one computer 602, or that one user may use multiple computers 602.

Described implementations of the subject matter can include one or more features, alone or in combination. For example, in a first implementation, a computer-implemented method for suppressing noises in seismic data, comprising: receiving, at a data processing apparatus, a set of seismic data associated with a subsurface region; flattening, by the data processing apparatus, the set of seismic data according to an identified seismic event; dividing, by the data processing apparatus, the set of seismic data into a plurality of spatial windows; randomizing, by the data processing apparatus, the set of seismic data according to a random sequential order; filtering, by the data processing apparatus, the randomized seismic data; and reorganizing, by the data processing apparatus, the filtered seismic data according to a pre-randomization order.

The foregoing and other described implementations can each, optionally, include one or more of the following features:

A first feature, combinable with any of the following features, wherein the seismic data is post-stack data.

A second feature, combinable with any of the previous or following features, wherein the seismic data includes at least one of pre-stack time migration results or pre-stack depth migration results.

A third feature, combinable with any of the previous or following features, wherein the identified seismic event is identified according to an interpretation of the subsurface region.

A fourth feature, combinable with any of the previous or following features, further comprising: generating, by the data processing apparatus, an image of the subsurface area based on the reorganized data.

A fifth feature, combinable with any of the previous or following features, further comprising: subtracting, by the data processing apparatus, the set of reorganized seismic data from the seismic data.

A sixth feature, combinable with any of the previous or following features, further comprising: filtering, by the data processing apparatus, the reorganized seismic data.

In a second implementation, a non-transitory computer-readable medium storing instructions which, when executed, cause a computing device to perform operations comprising: receiving, at a data processing apparatus, a set of seismic data associated with a subsurface region; flattening, by the data processing apparatus, the set of seismic data according to an identified seismic event; dividing, by the data processing apparatus, the set of seismic data into a plurality of spatial windows; randomizing, by the data processing apparatus, the set of seismic data according to a random sequential order; filtering, by the data processing apparatus, the randomized seismic data; and reorganizing, by the data processing apparatus, the filtered seismic data according to a pre-randomization order.

The foregoing and other described implementations can each, optionally, include one or more of the following features:

A first feature, combinable with any of the following features, wherein the seismic data is post-stack data.

A second feature, combinable with any of the previous or following features, wherein the seismic data includes at least one of pre-stack time migration results or pre-stack depth migration results.

A third feature, combinable with any of the previous or following features, wherein the identified seismic event is identified according to an interpretation of the subsurface region.

A fourth feature, combinable with any of the previous or following features, the operations further comprising: generating, by the data processing apparatus, an image of the subsurface area based on the reorganized data.

A fifth feature, combinable with any of the previous or following features, the operations further comprising: subtracting, by the data processing apparatus, the set of reorganized seismic data from the seismic data.

A sixth feature, combinable with any of the previous or following features, the operations further comprising: filtering, by the data processing apparatus, the reorganized seismic data.

In a third implementation, a device, comprising: at least one hardware processor; and a non-transitory computer-readable storage medium coupled to the at least one hardware processor and storing programming instructions for execution by the at least one hardware processor, wherein the programming instructions, when executed, cause the at least one hardware processor to perform operations comprising: receiving, at the least one hardware processor, a set of seismic data associated with a subsurface region; flattening, by the least one hardware processor, the set of seismic data according to an identified seismic event; dividing, by the least one hardware processor, the set of seismic data into a plurality of spatial windows; randomizing, by the least one hardware processor, the set of seismic data according to a random sequential order; filtering, by the least one hardware processor, the randomized seismic data; and reorganizing, by the least one hardware processor, the filtered seismic data according to a pre-randomization order.

The foregoing and other described implementations can each, optionally, include one or more of the following features:

A first feature, combinable with any of the following features, wherein the seismic data is post-stack data.

A second feature, combinable with any of the previous or following features, wherein the seismic data includes at least one of pre-stack time migration results or pre-stack depth migration results.

A third feature, combinable with any of the previous or following features, wherein the identified seismic event is identified according to an interpretation of the subsurface region.

A fourth feature, combinable with any of the previous or following features, the operations further comprising: generating, by the data processing apparatus, an image of the subsurface area based on the reorganized data.

A fifth feature, combinable with any of the previous or following features, the operations further comprising: subtracting, by the data processing apparatus, the set of reorganized seismic data from the seismic data.

A sixth feature, combinable with any of the previous or following features, the operations further comprising: filtering, by the data processing apparatus, the reorganized seismic data.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), mean that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., or less than 5 secs. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including, by way of example, a programmable processor, a computer, or multiple processors or computers. The apparatus can also be, or further include, special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data includes all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method for suppressing noises in seismic data, comprising:
   receiving, at a data processing apparatus, a set of seismic data associated with a subsurface region;
   flattening, by the data processing apparatus, the received set of seismic data according to an identified seismic event, wherein the identified seismic event is identified according to an interpretation of the subsurface region, and the identified seismic event comprises a fault, and wherein the flattening comprises:
   selecting an anchor trace; and
   squeezing or stretching other traces according to the anchor trace;
   dividing, by the data processing apparatus, the flattened set of seismic data into a plurality of spatial windows according to spatial distances of the seismic data in a horizontal direction, wherein each of the plurality of spatial windows corresponds to a different horizontal distance index;

randomizing, by the data processing apparatus, the windowed set of seismic data according to a random sequential order, wherein the randomizing comprises:
  assigning a new horizontal distance index to each of the plurality of spatial windows according to the random sequential order; and
  reordering positions of the plurality of spatial windows according to the new horizontal distance indices;

filtering, by the data processing apparatus, the randomized seismic data, wherein a median filtering window size used in the filtering is smaller than a randomization window size used in the randomizing;

reorganizing, by the data processing apparatus, the filtered seismic data according to a pre-randomization order; and generating, by the data processing apparatus, an image of the subsurface region based on the reorganized data.

2. The method of claim 1, wherein the seismic data is post-stack data.

3. The method of claim 2, wherein the seismic data includes at least one of pre-stack time migration results or pre-stack depth migration results.

4. The method of claim 1, further comprising: subtracting, by the data processing apparatus, the set of reorganized seismic data from the seismic data.

5. The method of claim 1, further comprising: filtering, by the data processing apparatus, the reorganized seismic data.

6. A non-transitory computer-readable medium storing instructions which, when executed, cause a computing device to perform operations comprising:
  receiving, at a data processing apparatus, a set of seismic data associated with a subsurface region;
  flattening, by the data processing apparatus, the received set of seismic data according to an identified seismic event, wherein the identified seismic event is identified according to an interpretation of the subsurface region, and the identified seismic event comprises a fault, and wherein the flattening comprises:
    selecting an anchor trace; and
    squeezing or stretching other traces according to the anchor trace;
  dividing, by the data processing apparatus, the flattened set of seismic data into a plurality of spatial windows according to spatial distances of the seismic data in a horizontal direction, wherein each of the plurality of spatial windows corresponds to a different horizontal distance index;
  randomizing, by the data processing apparatus, the windowed set of seismic data according to a random sequential order, wherein the randomizing comprises:
    assigning a new horizontal distance index to each of the plurality of spatial windows according to the random sequential order; and
    reordering positions of the plurality of spatial windows according to the new horizontal distance indices;
  filtering, by the data processing apparatus, the randomized seismic data, wherein a median filtering window size used in the filtering is smaller than a randomization window size used in the randomizing;
  reorganizing, by the data processing apparatus, the filtered seismic data according to a pre-randomization order; and
  generating, by the data processing apparatus, an image of the subsurface region based on the reorganized data.

7. The non-transitory computer-readable medium of claim 6, wherein the seismic data is post-stack data.

8. The non-transitory computer-readable medium of claim 7, wherein the seismic data includes at least one of pre-stack time migration results or pre-stack depth migration results.

9. The non-transitory computer-readable medium of claim 6, the operations further comprising: subtracting, by the data processing apparatus, the set of reorganized seismic data from the seismic data.

10. The non-transitory computer-readable medium of claim 6, the operations further comprising: filtering, by the data processing apparatus, the reorganized seismic data.

11. A device, comprising:
  at least one hardware processor; and
  a non-transitory computer-readable storage medium coupled to the at least one hardware processor and storing programming instructions for execution by the at least one hardware processor, wherein the programming instructions, when executed, cause the at least one hardware processor to perform operations comprising:
    receiving, at the least one hardware processor, a set of seismic data associated with a subsurface region;
    flattening, by the least one hardware processor, the received set of seismic data according to an identified seismic event, wherein the identified seismic event is identified according to an interpretation of the subsurface region, and the identified seismic event comprises a fault, and wherein the flattening comprises:
      selecting an anchor trace; and
      squeezing or stretching other traces according to the anchor trace;
    dividing, by the least one hardware processor, the flattened set of seismic data into a plurality of spatial windows according to spatial distances of the seismic data in a horizontal direction, wherein each of the plurality of spatial windows corresponds to a different horizontal distance index;
    randomizing, by the least one hardware processor, the windowed set of seismic data according to a random sequential order, wherein the randomizing comprises:
      assigning a new horizontal distance index to each of the plurality of spatial windows according to the random sequential order; and
      reordering positions of the plurality of spatial windows according to the new horizontal distance indices;
    filtering, by the least one hardware processor, the randomized seismic data, wherein a median filtering window size used in the filtering is smaller than a randomization window size used in the randomizing;
    reorganizing, by the least one hardware processor, the filtered seismic data according to a pre-randomization order; and
    generating, by the least one hardware processor, an image of the subsurface region based on the reorganized data.

12. The device of claim 11, wherein the seismic data is post-stack data.

13. The device of claim 12, wherein the seismic data includes at least one of pre-stack time migration results or pre-stack depth migration results.

14. The device of claim 11, the operations further comprising: subtracting the set of reorganized seismic data from the seismic data.

* * * * *